United States Patent
Tolle et al.

(10) Patent No.: US 8,430,110 B2
(45) Date of Patent: Apr. 30, 2013

(54) DOUBLE-SEAT VALVE HAVING A SEAT-CLEANING FUNCTION, AND METHOD FOR CLEANING SAID DOUBLE-SEAT VALVE HAVING A SEAT-CLEANING FUNCTION

(75) Inventors: Bastian Tolle, Buechen (DE); Gundar Scholz, Reinbek (DE); Jens Burmester, Grambek (DE)

(73) Assignee: GEA Tuchenhagen GmbH, Buchen (DE)

( * ) Notice: Subject to any disclaimer, the term of this patent is extended or adjusted under 35 U.S.C. 154(b) by 469 days.

(21) Appl. No.: 12/740,428

(22) PCT Filed: Oct. 28, 2008

(86) PCT No.: PCT/EP2008/009101
§ 371 (c)(1),
(2), (4) Date: Apr. 29, 2010

(87) PCT Pub. No.: WO2009/056277
PCT Pub. Date: May 7, 2009

(65) Prior Publication Data
US 2010/0243073 A1    Sep. 30, 2010

(30) Foreign Application Priority Data
Oct. 30, 2007 (DE) .......................... 10 2007 051 730

(51) Int. Cl.
*F16K 51/00* (2006.01)
(52) U.S. Cl.
USPC .................... 137/15.04; 137/240; 137/614.18
(58) Field of Classification Search .... 137/15.04–15.06, 137/238–240, 614.17–614.19
See application file for complete search history.

(56) References Cited

U.S. PATENT DOCUMENTS

| | | | |
|---|---|---|---|
| 5,575,305 A | 11/1996 | Mieth | |
| 6,676,047 B1 * | 1/2004 | Lindholm Jensen et al. | 137/240 |
| 7,845,368 B2 * | 12/2010 | Burmester et al. | 137/614.18 |

FOREIGN PATENT DOCUMENTS

| | | |
|---|---|---|
| DE | 3835944 A1 | 4/1990 |
| DE | 4118874 A1 | 12/1992 |
| DE | 202006004173 U1 | 10/2006 |
| EP | 0587690 B1 | 3/1994 |
| EP | 0646741 A1 | 4/1995 |
| WO | 2005/098287 A1 | 10/2005 |

* cited by examiner

*Primary Examiner* — Kevin Lee
(74) *Attorney, Agent, or Firm* — Vidas, Arrett & Steinkraus, P.A.

(57) ABSTRACT

A double-seat valve having a seat-cleaning function, wherein the double-seat valve opens downward, and the two closing elements can be moved independently of each other by a partial lift in each case gap-wide into a seat cleaning position for the purpose of cleaning their seat such that the dependently driven second closing element is pushed into its respective seat cleaning position by a second partial lift in the same direction of the opening movement, and the independently driven first closing element is pushed into its respective seat cleaning position by a first partial lift in the direction counter to the opening lift.

17 Claims, 5 Drawing Sheets

DOUBLE-SEAT VALVE HAVING A SEAT-CLEANING FUNCTION, AND METHOD FOR CLEANING SAID DOUBLE-SEAT VALVE HAVING A SEAT-CLEANING FUNCTION

CROSS-REFERENCE TO RELATED APPLICATIONS

This application is a U.S. National Stage application which claims priority to PCT//EP2008/009101, filed on Oct. 28, 2008, which claims priority to DE 10 2007 051 730.2, filed on Oct. 30, 2007, the contents of which is hereby incorporated by reference.

STATEMENT REGARDING FEDERALLY SPONSORED RESEARCH

Not applicable

BACKGROUND OF THE INVENTION

The invention relates to a double-seat valve having a seat-cleaning function having two serially disposed closing elements that are movable relative to each other that in the closed position of the double-seat valve prevent an overflow of fluid from one valve housing part into another and that in the closed as well as in the open position define a leakage cavity, which has a drain outlet leading downward, relative to a vertical arrangement of the double-seat valve, out of the associated valve housing part, having the first closing element that is designed as a slide piston and is driven independently and in its closed position rests, forming a seal, in the connecting opening joining the valve housing parts together, and during its opening movement comes into contact in a sealing manner with a second closing element assigned to the second seat, and carries this also into the open position, having a first seat seal arranged in the first sealing element that seals radially against a cylindrical first seat formed in the connecting opening, having the closing elements that can be moved gap-wide independently of each other by a partial lift, in each case, into a seat cleaning position for the purpose of flushing their seats, wherein the second closing element can be moved by a second partial lift in the same direction as the opening movement, and the first closing element can be moved by a first partial lift in the direction counter to the opening movement into its respective seat cleaning position, and having valve rods, arranged concentrically inside each other, for the closing elements that are led upward into a common drive, and having a tubular shaft, arranged at the lower lying closing element, that penetrates the associated valve housing part radially outside downward in a sealing manner, and that connects the leakage cavity radially inside via a drain to the surroundings of the double-seat valve, and that merges upward into the valve rod of the lower lying closing element.

The second closing element can also be equipped as a slide piston with radially acting sealing means, wherein the associated cylindrical second seat is formed in the connecting opening. However, the second closing element can also be implemented as a seat plate that seals axially or axially/radially on an assigned planar or conical second seat. Double-seat valves having a seat-cleaning function with the initially listed features open either upward (normal case) or downward into the fully open position. For an upward opening double-seat valve, the independently driven first closing element is disposed at the bottom, and for the reverse opening direction, the independently driven first closing element is disposed at the top.

From the German patent DE 38 35 944 C2, a double-seat valve having a seat-cleaning function is known, in which the independently driven first closing element is designed as a slide piston, and can be transferred during the associated seat cleaning by a first partial lift, in the direction counter to the opening movement, into its seat cleaning position (FIG. 3). The dependently driven second closing element is implemented as a seat plate, which seals on an associated conical seat, and it is transferred by a second partial lift, in the same direction as the opening movement, into its seat cleaning position, in which an annular gap that is open from below upward, relative to a vertical assembly position, is formed between closing element and associated seat.

A tubular shaft of the first closing element, located at the bottom, that penetrates through the lower valve housing part in a manner sealing towards the bottom, is enlarged in the movable penetration area into a cylinder, a so-called pressure balancing piston, such that an annular surface that is approximately equal to the adjacent annular surface on the lower side of the first closing element, results on the top side of the pressure balancing piston. When the first closing element is moved downward into the seat cleaning position, a circular-shaped gap that is open from above downward is formed between the outer surface of the pressure balancing piston and a lower annular collar of the lower valve housing part, and via this gap the outer surface can be flushed simultaneously with the first closing element. In connection with a pot adjacent to the annular collar, furthermore, a flush device is formed with which the pressure balancing piston on the lower, first closing element can be cleaned completely so that displaced product in the passage area can be cleaned reliably at full opening and closing lift. A cleaning of the valve rod of the upper, second closing element in the area of its passage through the associated valve housing part is not provided.

The patent EP 0 587 690 B1 describes a double-seat valve having two closing elements, each constructed as a slide piston. The double-seat valve opens from above downward, relative to a vertical assembly position. The valve rods provided for actuation of the two closing elements are both guided upward out of the associated valve housing part and into a common drive. The hollow rod of the upper, first closing element is expanded in its penetration area with the valve housing into a pressure balancing piston, and this penetration area is provided with a flush device, so that a sufficiently large axial extension area of the pressure equalization piston can be subjected to cleaning if required. The lower, second closing element is elongated into a tubular shaft formed likewise as a pressure balancing piston, which is guided downward out of the associated valve housing part, in a sealed manner. In a preferred embodiment, this penetration location also is assigned a flush device so that a sufficiently larger axial extension area also of this pressure balancing piston can be subjected to cleaning.

The double-seat valve above is only capable of seat cleaning under certain conditions, i.e., its seats do not open gap-wide by a respective partial lift. Rather, for cleaning the seats, the associated closing elements are pushed only so far in the same direction, or counter direction, that the respective partially exposed seats can be subjected to cleaning fluid (so-called wipe cleaning). The provisioning of cleaning fluid occurs in that with a partial lift, in the direction counter to the complete opening lift of the double-seat valve, the passage of the pressure balancing piston associated with the respective closing element is also exposed such that the flow of cleaning means is branched off through the exposed passage out of the valve housing part, and in the process cleans this passage and at least one of the following areas, namely the other passage, the leakage cavity and the accessible seat.

In the following, the term rod passage shall include, along with the passage of the valve rod through the associated valve housing part, also the passage of the tubular shaft, arranged on the lower lying closing element, penetrating downward through the associated valve housing part. It can be stated in principle that the rod passage, or the passage of the pressure balancing piston provided in this area into which the valve rod or the tubular shaft respectively can be expanded where necessary, of the independently driven closing element is more critical than the corresponding passage with the dependently driven closing element. This results from the fact that during the opening lift the independently driven closing element always moves in the direction of the dependently driven closing element, and as a result the associated valve rod or the rod shaft or the associated pressure balancing piston, of the independently driven closing element is pushed out of the penetration area into the interior of the associated valve housing part. With respect to the dependently driven closing element, the reverse conditions arise; parts of the valve rod or rod shaft or the associated pressure balancing piston in this area are, in the scope of the movement of the opening lift, pushed out of the interior of the associated valve housing part into the penetration area. If product is present in both valve housing parts, then during the opening and closing lift a carryover of the product into the associated penetration areas of the rod passages of both closing elements possibly results. However, if cleaning fluid is present in the course of seat cleaning, then the parts of the valve rod or of the rod shaft or the associated pressure balancing piston of the dependently driven closing element, extending into the valve housing part, are already cleaned, and as a result are moved in a cleaned state into the passage during the opening lift or during partial lift.

With the known double-seat valve according to EP 0 587 690 B1, as with all other double-seat valves that open downward and have a leakage drain guided downward out of the valve housing (for example, the double-seat valve according to EP 0 646 741 A1), it is advantageous that in the open position of the double-seat valve, the passage cross-section of a connecting opening connecting the two valve housing parts together is not constricted by the cross-section of the leakage drain outlet that is formed as a tubular shaft and is disposed at the lower lying closing element. This then, reduces in particular the nominal width of the valve housing, determined by the passage cross-section of the connecting opening, by 1 to 2 nominal widths if, for example as required in the USA, the passage cross-section of the leakage drain outlet between the leakage cavity and the surroundings of the double-seat valve must be equal to the largest passage cross-section of the tubing attached to the double-seat valve.

The double-seat valve of the initially described type having a seat-cleaning function, desirably has a sufficient cleaning of the passage of the valve rod or of the valve rod expanded to a pressure balancing piston, of the independently driven closing element, as well as to specify a method for cleaning this double-seat valve having a seat-cleaning function.

BRIEF SUMMARY OF THE INVENTION

A double-seat valve, which with respect to its basic construction performs a downward opening movement relative to a vertical arrangement, simultaneously with the seat cleaning of the independently driven, first closing element constructed as a slider piston, a second annular gap is to be exposed between the first valve rod constructed as a hollow rod for the first closing element and the first rod seal. For this purpose, the first closing element is pushed out of its closed position by a first partial lift, counter to its opening direction, so far out of the connecting opening into the interior of the first valve housing part until the associated cylindrical valve seat is opened gap-wide for the purpose of the seat cleaning (formation of a first annular gap). In the process, the associated first valve rod in the area of the first rod seal, performs a corresponding synchronous partial lift movement. The first rod seal in conjunction with the first valve rod or the first pressure balancing piston, into which the first valve rod is expanded if necessary, implements a sealing location at a first passage.

The cleaning fluid quasi-"harvested" at the first rod seal from the interior of the first valve housing part, is to be fed into a flush chamber of a first flush device, which completely encloses with a flush chamber the first valve rod or the first valve rod expanded into a first pressure balancing piston in connection to the first rod seal. For this purpose, the second annular gap connects the interior of the first valve housing part to the flush chamber.

The invention provides that the flush chamber has an axial extension length, starting at the sealing location, of at least the full opening lift of the double-seat valve. This dimensional constraint guarantees that the cleaning fluid flushes around the entire extension area of the first valve rod, which has come into contact with the product during the complete opening and closing movement, and is pushed via the first rod seal out of the interior of the first valve housing part in the direction of the flush chamber.

The formation of the second annular gap with the necessary radial depth can, in principle, occur in two ways, as is further proposed, namely on the one hand, either by a radial second setback extending into the interior of the first valve housing part provided in this area on the first valve rod or the first pressure balancing piston, or by an axially bounded radial recess, provided in this area on the first valve rod or the first pressure balancing piston. For this, the radial second setback or the radial recess are to be axially dimensioned so that in the seat cleaning position the first rod seal disposed on the housing-side is completely exposed.

The second way of forming the second annular gap in the area in question occurs, on the other hand, as is provided in a further proposal, in that the necessary radial depth of the second annular gap is formed by a radial recess provided in this area in the first valve housing part on the housing-side, and that is axially limited and that the first rod seal is disposed on the first valve rod or the first pressure balancing piston. The exposure of the first rod seal in the associated seat cleaning position occurs in that the first rod seal is positioned in the housing-side recess that is sufficiently dimensioned axially.

If the first valve rod in the movable area of the first passage is formed as a first pressure balancing piston, whose annular surface limiting the interior of the first valve housing part is formed equal to, or approximately equal to the adjacent annular surface of the first closing element, then the features described above for the gap formation in the area of the first rod seal can be transferred correspondingly to this configuration.

To minimize the shifting forces at the second closing element and to maximize the leakage outlet disposed in the tubular shaft, it is further provided that the tubular shaft in the movable penetration area of the second valve housing part is formed as a second pressure balancing piston, whose diameter is constructed marginally smaller than the diameter of the connecting opening.

According to a first embodiment, the cleaning fluid is led out of the flush chamber via an outlet connection leading to the surroundings of the double-seat valve. For this purpose, the flush chamber of a first flush device is connected via an outlet connection to the surroundings of the double-seat valve.

Here, the flush chamber is provided with an overflow such that the cleaning fluid after its entrance into the flush chamber must initially rise in this chamber by the provided axial extension area, before it can reach from there into the outlet connection. Thereby it is achieved that the flush chamber is discharged at its upper end into the overflow, which then again is connected to the outlet connection.

So that the flush chamber that is to be flooded with cleaning fluid up to the overflow can, following the seat cleaning, be emptied completely up to the upper edge of the first rod seal or to its marginal boundary, there is, located in this area at the periphery of the flush chamber, at least one emptying bore that connects the base area of the flush chamber to the outlet connection leading outwards into the surroundings.

It is further assured that with a closed sealing location, i.e., other than in the seat cleaning position, no sump forms above the first rod seal within the flush chamber. For this purpose, the lower edge of the bore of the outlet connection extends down to the upper edge of the first rod seal or to its marginal boundary.

It is further provided to drain the cleaning fluid out of the flush chamber inwards, and from here, into the leakage cavity. For this, it is provided that the provided connection path begins with a transverse bore that is formed in the first valve rod, and that discharges into the flush chamber. In the further course of the connection path, two alternative solutions are provided. The first solution provides that the other side of the transverse bore discharges into an annular gap that is formed between the first valve rod, designed as a hollow rod, and the second valve rod penetrating this centrally. With the second solution, the other side of the transverse bore discharges into a bore, formed peripherally in the first valve rod.

Another proposal provides to drain the cleaning fluid out of the flush chamber inward, and from here, into the leakage drain outlet disposed in the tubular shaft. For this, it is provided that the provided connection path begins with a transverse bore that is formed in the first valve rod, and that discharges into the flush chamber. An advantageous design of the further connection path provides that the other side of the transverse bore discharges into a central bore formed in the second valve rod.

With the double-seat valve having a seat-cleaning function according to the invention, a method according to the invention can be performed for cleaning this double-seat valve having a seat-cleaning function, in which in the course of the gap-wide exposure of the seat of the closing element that is pushed into its seat cleaning position by a first partial lift, in the direction counter to the first opening lift, simultaneously a sealed first passage of a valve rod connected to the closing element through the associated valve housing part is exposed gap-wide, such that cleaning fluid from the interior of the associated valve housing part is fed through the exposed first passage to the area of the valve rod contaminated with product during complete opening and closing lift.

BRIEF DESCRIPTION OF THE SEVERAL VIEWS OF THE DRAWINGS

Exemplary embodiments of the invention are represented in the figures of the drawing, and are described in the following. They show.

Whereas the invention can be implemented in most varied embodiments, in the drawings particularly preferred embodiments are shown and described in the following with the understanding that these only represent examples of the invention, and that the invention is not restricted to these specifically represented examples.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

A double-seat valve 1 (FIG. 1 and additionally FIGS. 3a, 3b) on the housing-side consists essentially of a valve housing 2, composed of a first valve housing part 2a and a second valve housing part 2b, wherein the valve housing parts 2a, 2b are connected together via a connecting opening 2c. A first seat 2d, having a cylindrical shape, is formed in the connecting opening 2c. An independently driven first closing element 3 implemented as a slide piston slides in a sealing manner in the cylindrical first seat 2d, and a radially sealing first seat seal 10 is received within a groove disposed in the circumferential surface of said closing element. Beneath the first seat seal 10 on the first closing element 3, relative to a vertical assembly position of the double-seat valve 1, a radial first setback 3c is provided that after a first partial lift T1 of a relatively short axial extension (see FIG. 2) generates a gap-wide opening of the valve seat 10/2d between the first seat seal 10 and the cylindrical first seat 2d in the form of a first annular gap S1 (for this, see also FIGS. 4a, 4b). If cleaning fluid is present in the first valve housing part 2a, this fluid, in the form of a first seat cleaning flow R1, enters through first annular gap S1 out of the first valve housing part 2a into a leakage cavity 16 between the first closing element 3 and a second closing element 4, and from there into the surroundings of the double-seat valve 1 via connecting openings 4d and a subsequent drainage bore 4c, which is bounded by a tubular shaft 4b disposed on the second closing element 4, which penetrates the second valve housing part 2b downward (for this, see FIGS. 3a, 3b).

The second closing element 4 is formed either as a slide piston or as a seat plate, and functions together with a second seat 2e, which is disposed in the connecting opening 2c or is disposed, connecting to the latter, in the second valve housing part 2b. The represented double-seat valve 1 opens from above downward, wherein the independently driven first closing element 3, starting from its represented closed position (FIGS. 1, 3a), in the course of its opening movement comes in contact with the dependently driven second closing element 4, and both closing elements 3, 4 arrive in the completely open position after a complete opening lift H.

Figures 1, 2:
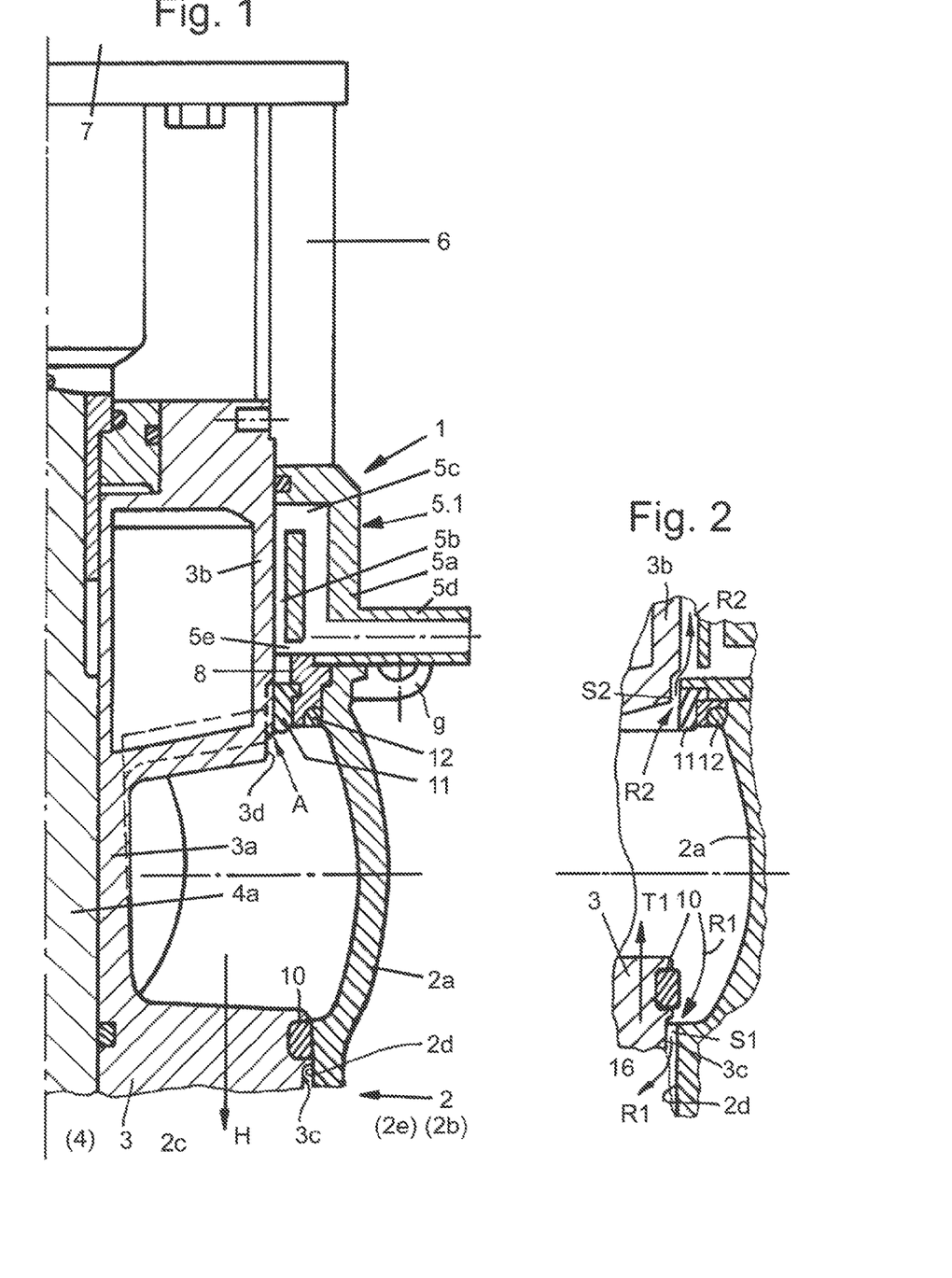
FIG. 1 a meridian section through a first embodiment of the proposed double-seat valve having a seat-cleaning function with cleaning of the rod passage according to the invention, wherein the double-seat valve is located in its closed position, and is represented on one hand without a drive, and on the other hand is represented only in half, and above the seal area of the upper, first closing element.
FIG. 2 likewise, a meridian section through the second embodiment of the proposed double-seat valve, minimally modified relative to the first embodiment according to FIG. 1, in the area above the first rod seal, wherein this valve is in the seat cleaning position and only the gap-wide exposed seat area and the gap-wide opened passage of the first valve rod expanded into a pressure balancing piston are represented in sections.

The first closing element 3 is connected via a first valve rod 3a, formed as a hollow rod, to a drive 7 (FIGS. 3a, 3b) which as a rule is pressurized by a pneumatic pressure means, and is designed spring closed. Here, in specific use cases, spring opening or double-acting pneumatic drives 7 are also used. The first valve housing part 2a and the drive 7 are connected together via a lantern housing 6. The second closing element 4 is likewise connected to the drive 7 via second valve rod 4a guided in the hollow rod 3a. The drive 7 has the capability to generate both the opening and closing movement of the double-seat valve 1 with the opening lift H, as well as a first partial lift T1, and a second partial lift T2 of the second closing element 4 (FIGS. 4a, 4b). The first partial lift T1 is oriented in the direction counter to the opening lift H, and moves the first closing element 3 into its seat cleaning position, as represented in FIG. 2. The second partial lift T2 is oriented in the same direction as the opening lift H, and moves the second closing element 4 into its seat cleaning position in which the associated valve seat 4/2e is opened gap-wide, and an associated annular gap is formed, which generates a second seat cleaning flow from the second valve housing part 2b into the leakage cavity 16 (not represented).

The first valve rod 3a is expanded in the area of its passage through the first valve housing part 2a into a so-called first pressure balancing piston 3b (FIGS. 1, 3a, 3b), which is dimensioned in its cross-section such that the annular surface formed on its lower side is equal to or approximately equal to the annular surface formed on the upper side of the first closing element 3. The forces on the two annular surfaces from the pressure of the fluid present in the first valve housing part 2a are counterbalanced by this design so that the drive 7 is relieved to the greatest extent possible of the pressure forces from this fluid.

The first pressure balancing piston 3b is slidably sealed at the outside via a first rod seal 11, 11*, wherein the latter (11) is either received in a ring shaped housing insert 8 (FIG. 1) or in the first valve housing part 2a (FIGS. 3a, 3b) as a modified first rod seal 11*. The exterior of first pressure balancing piston 3b or, if no extension of this is provided, the exterior of first valve rod 3a and the inside of the first rod seal 11 or 11* form, in this regard, a sealing location 3b, 11 or 3b, 11* or 3a, 11 or 3a, 11* at a first passage A. The housing insert 8 is statically sealed on the outside in an opening of the first valve housing part 2a via a housing seal 12, whereas the outside of the modified first rod seal 11* additionally seals the valve housing-side.

A first flush device 5.1 (FIGS. 1, 3a) or a modified first flush device 5.1* (FIG. 3b), completely penetrated by the first pressure balancing piston 3b, is connected to the first valve housing part 2a, wherein the first valve housing part 2a and a flush chamber housing 5a of the flush device 5.1, 5.1* are preferably provided in each case at their connecting location with a clamping flange, which connects a clamping ring 9 together in a positive-locking and frictional manner (FIG. 1).

The flush chamber housing 5a forms an annular flush chamber 5b, around the first pressure balancing piston 3b, where said flush chamber ends above in an overflow 5c (FIG. 1), and is axially dimensioned so that the first pressure balancing piston 3b can be slid within it at least to the extent of the complete opening lift H. The lower edge of the bore of an outlet connection 5d, which in the first case (FIG. 1) has a first connection to the flush chamber 5b through the overflow 5c, or in the second case (FIGS. 2, 3a) has a direct connection to the flush chamber 5b, ends directly above the first rod seal 11 or directly above a marginal boundary of the latter (see FIGS. 2 and 3a). When the double-seat valve 1 is no longer in the seat cleaning position of the first closing element 3, the flush chamber 5b can be completely emptied via an emptying bore 5e (FIG. 1), which creates a direct connection to said flush chamber 5b in the area of the lower edge of the bore of the outlet connection 5d. The continued presence of residual cleaning fluid above the first rod seal 11, a so-called sump formation, which is still visible in the rather schematic representation of FIG. 1, is undesired in any case; it is completely eliminated in the real constructive design (for this, see also FIG. 3a).

Figure 3A:
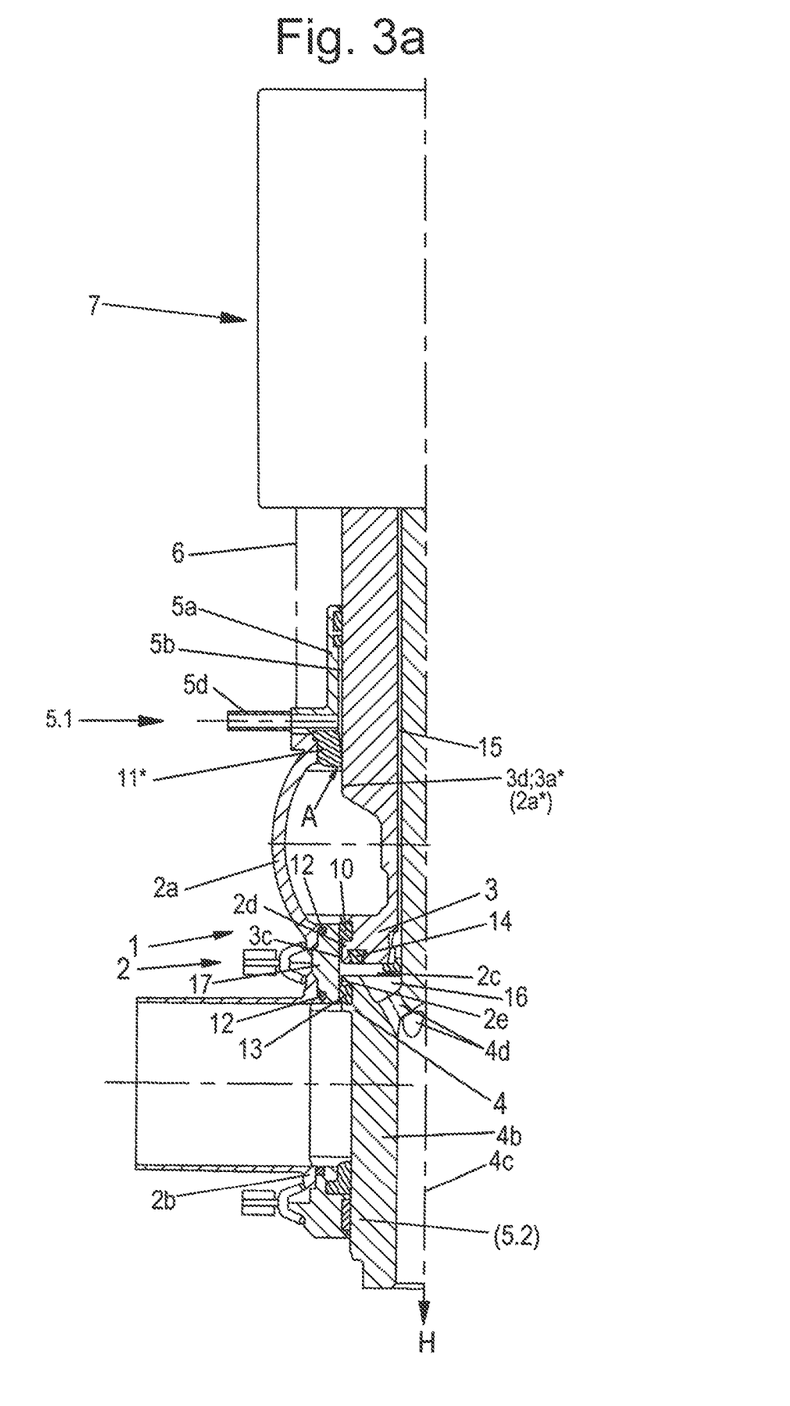
FIG. 3a a meridian section through a second embodiment of the proposed double-seat valve having a seat-cleaning function with cleaning of the rod passage according to the invention, wherein the double-seat valve is in its closed position, and on one hand is represented without a concrete embodiment of a drive, and on the other hand, only the left side relative to the representation position.
Figure 3B:
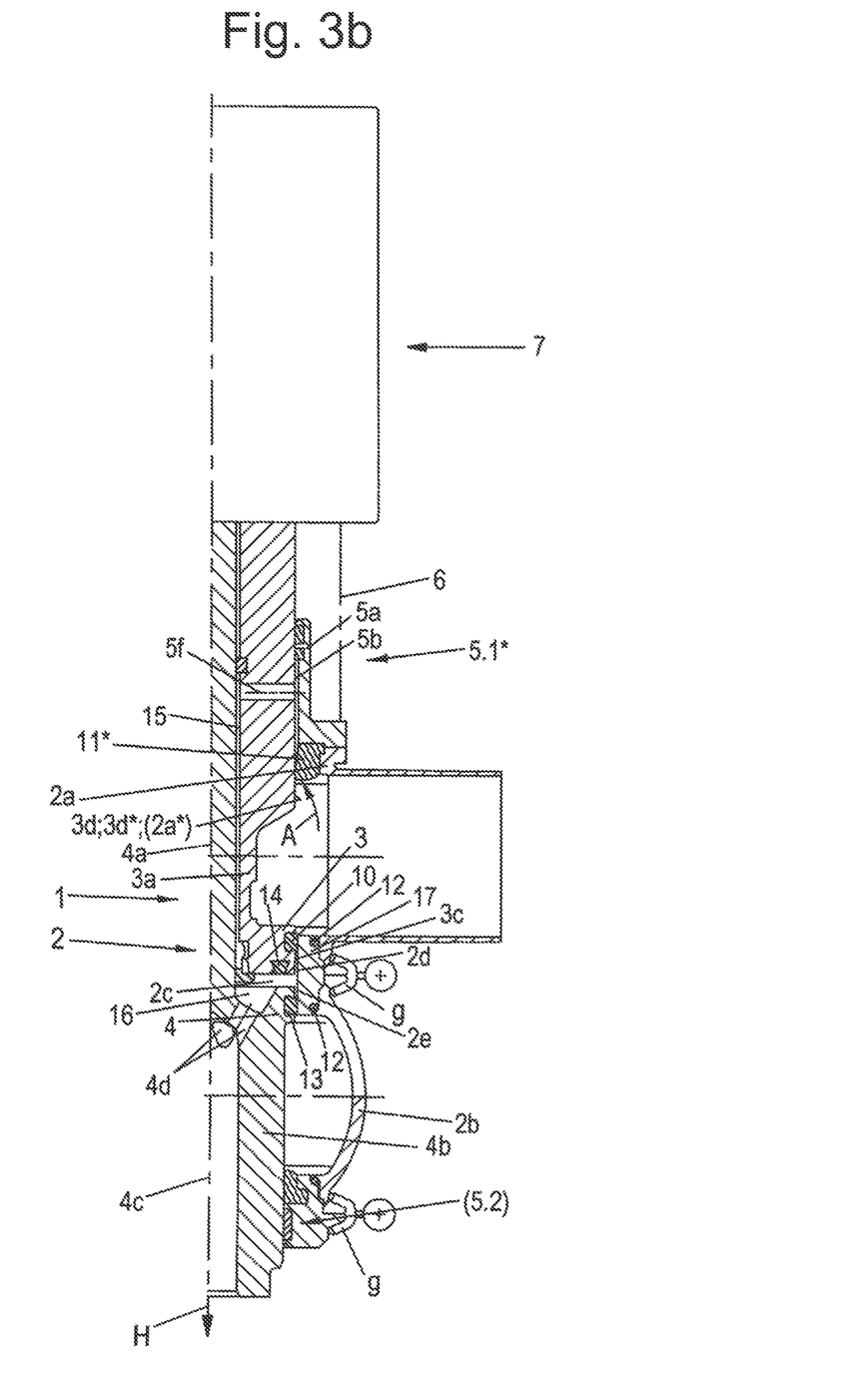
FIG. 3b a meridian section through a third embodiment of the proposed double-seat valve having a seat-cleaning function with cleaning of the rod passage according to the invention, wherein the double-seat valve is in its closed position, and is represented on one hand without a concrete embodiment of a drive, and on the other hand, only the right side relative to the representation position.
Figure 4A:
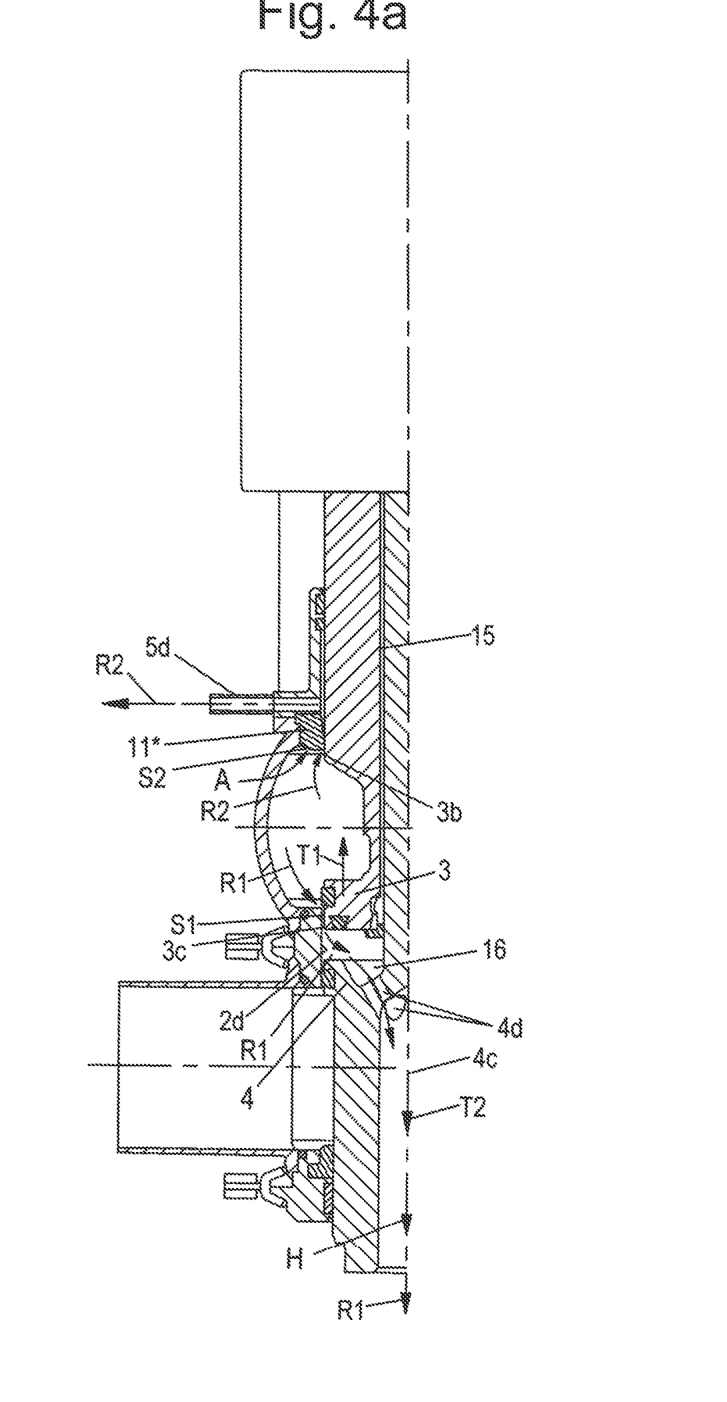
FIG. 4a a meridian section through the second embodiment of the proposed double-seat valve having a seat-cleaning function according to FIG. 3a, wherein the double-seat valve is in the seat cleaning position of the upper, independently driven first closing element, and only the left side relative to the represented position is represented, and FIG. 4b a meridian section through the third embodiment of the proposed double-seat valve having a seat-cleaning function according to FIG. 3b, wherein the double-seat valve is in the seat cleaning position of the upper, independently driven first closing element, and only the right side relative to the represented position is represented.
Figure 4B:
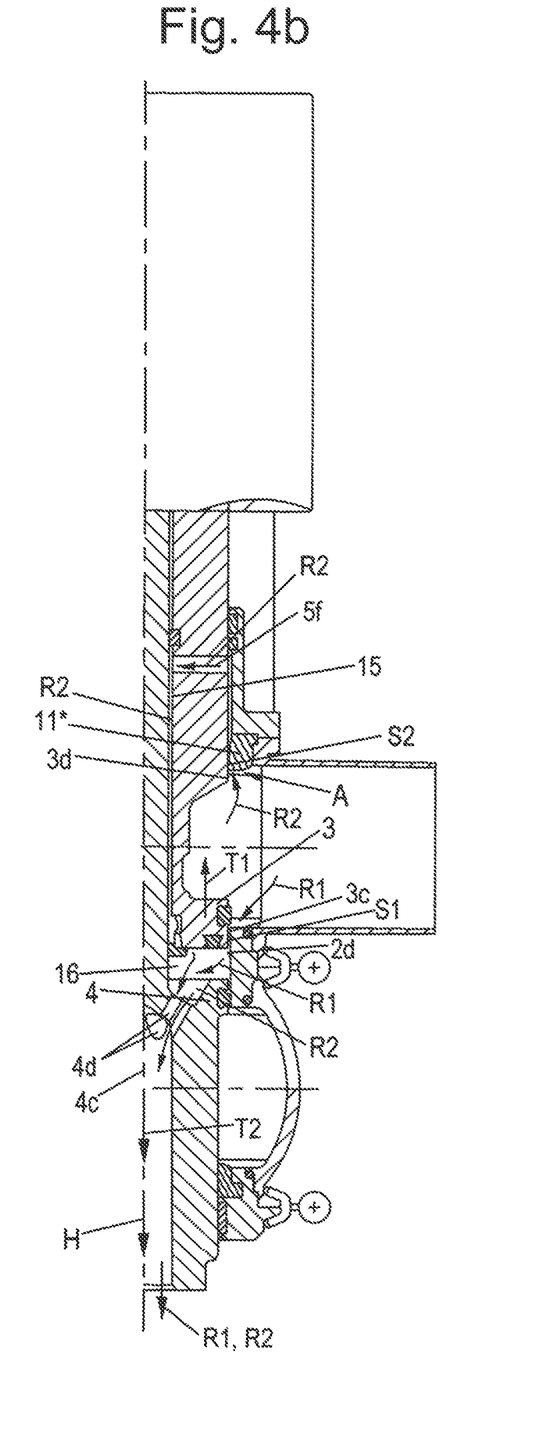

A radial second setback 3d that ensures the necessary radial depth of a second annular gap S2, is formed at the end-side section of the first pressure balancing piston 3b, which in the closed position of the first closing element 3 extends beyond the first rod seal 11, 11* into the interior of the first valve housing part 2a (FIGS. 1, 3a, 3b). The peripheral surface of this second setback 3d, after completion of the first partial lift T1 (see FIGS. 2, 4a, 4b), together with the rod seal 11, 11*, forms the second annular gap S2, so that in the seat cleaning position of the first closing element 3, the first passage A is exposed gap-wide, and a rod cleaning flow R2 is generated, which flows out of the interior of the first valve housing part 2a over the exposed first rod seal 11, 11* into the flush chamber 5b. If the latter is equipped with the overflow 5c (FIG. 1), then the cleaning fluid rises up to this height, and flows over the outlet connection 5d into the surroundings of the double-seat valve 1. After the completion of the seat cleaning in connection with the cleaning of the first passage A, the flush chamber 5b can be emptied completely via the emptying bore 5e. With the embodiment according to the FIGS. 3a, 4a, in the course of the rod cleaning, the flush chamber 5b is subjected largely up to its upper end with cleaning fluid, and the complete emptying of the flush chamber 5b after the rod cleaning is guaranteed in that the lower edge of the bore of the outlet connection 5d extends down to the upper edge of the modified first rod seal 11*, or to its marginal boundary.

The necessary radial depth of the second annular gap S2 is formed alternatively by an axially bounded radial recess 3d*, provided in this area at the first valve rod 3a, 3b. Alternatively, a further proposal provides to form the necessary radial depth of the second annular gap S2 by an axially bounded housing-side radial recess 2a*, provided in this area in the first valve housing 2a. These two alternative solutions are not represented.

In the FIGS. 3b and 4b (right side representation), likewise as in the FIGS. 3a and 4a (left-side representation), the double-seat valve 1 having a seat-cleaning function is represented completely beneath the drive 7. This embodiment of the double-seat valve 1 has the second closing element 4 formed as a slide piston that radially seals with a second seat seal 13 in the cylindrical second seat 2e formed in the connecting opening 2c. The connecting opening 2c with the two seats 2d, 2e is disposed in a seat ring 17, which is sealed on the top via a housing seal 12 against the first valve housing part 2a, and on the bottom side via a further housing seal 12 against the second valve housing part 2b. A center seal 14 in the front face of the first closing element 3, facing towards the second closing element 4, provides a sealing contact of the two closing elements 3, 4 with each other, when they are in the open position, or in the opening and closing movement of the double-seat valve 1. With this, in these positions, a seal of the leakage cavity 16 against the interiors of the valve housing parts 2a, 2b is also guaranteed. The valve housing parts 2a, 2b are equipped with clamping flanges, which are connected together via a tension ring 9. A corresponding connection exists between the second valve housing part 2b and a housing cover, not designated, which is penetrated by the tubular shaft 4b downward in a sealed and guided manner.

The tubular shaft 4b of the second closing element 4, penetrating the second valve housing 2b downward in a sealed manner, which can also be expanded into a second pressure balancing piston 4b in the previously described manner, can in the penetration area with the second valve housing 2b and in connection to it be bounded by a second flush device 5.2, so that these areas can also reliably be cleaned, simultaneously with the seat cleaning of the second closing element 4, largely comparable to the previously described procedure in connection with the seat cleaning of the first closing element 3 and the cleaning of the first passage A.

With the embodiment of the double-seat valve according to the FIGS. 3b, 4b, the discharge of the rod cleaning flow R2 out of the flush chamber 5b occurs via the interior of the double-seat valve 1. For this purpose, the flush chamber 5b is connected either to the leakage cavity 16 (represented) or to the drain bore 4c in the tubular shaft 4b (not represented), and this connection path begins with a transverse bore 5f, formed in the first valve rod 3a, 3b, and discharging into the flush chamber 5b. The transverse bore discharges on the other side into an annular gap 15, which is formed between the first valve rod 3a, 3b, formed as a hollow rod, and the second valve rod 4a penetrating this centrally. Alternatively to the connection path, via the annular gap 15, it is provided that the transverse bore 5f discharges on the other side into a bore formed decentrally in the first valve rod 3a, 3b (not represented). The connection path to the drain bore 4c can also be implemented in that the transverse bore 5f discharges on the other side into a central bore (not represented) formed in the second valve rod 4a.

It is understood from the preceding that different modifications and variants of the double-seat valve 1 having a seat-cleaning function can be realized without deviating from the spirit and the novel concept of the present invention. It is to be understood that no limitation is intended to the specific embodiments illustrated here. The disclosure shall include all such modifications which are within the claimed scope of protection of the claims.

REFERENCE LIST OF THE ABBREVIATIONS 1 double-seat valve
2 valve housing
2a first valve housing part
2a* housing-side recess
2b second valve housing part
2c connecting opening
2d (cylindrical) first seat
2e second seat (radial; conical; planar and orthogonal to the longitudinal axis)
3 first closing element (slide piston)
3a first valve rod (hollow rod)
3a, 11 sealing location
3a, 11* sealing location
3b first pressure balancing piston
3b, 11 sealing location
3b, 11* sealing location
3c (radial) first setback
3d (radial) second setback
3d* radial recess
4 second closing element (seat plate or slide piston)
4a second valve rod
4b tubular shaft (second pressure balancing piston)
4c drain bore
4d connecting opening
5.1 first flush device
5.1* modified first flush device
5a flush chamber housing
5b flush chamber
5c overflow
5d outlet connection
5e emptying bore
5f transverse bore
5.2 second flush device
6 lantern housing
7 drive
8 housing insert
9 tension ring
10 first seat seal (radially sealing)
11 first rod seal
11* modified first rod seal
12 housing seal
13 second seat seal (radially or radially/axially or axially sealing)
14 central seal
15 annular gap
16 leakage cavity
17 seat ring
A first passage
H opening lift
R1 first seat cleaning flow
R2 rod cleaning flow
S1 first annular gap
S2 second annular gap
T1 first partial lift
T2 second partial lift This completes the description of the preferred and alternate embodiments of the invention. Those skilled in the art may recognize other equivalents to the specific embodiment described herein which equivalents are intended to be encompassed by the claims attached hereto.

The invention claimed is:

1. A double-seat valve (1) having a seat-cleaning function with first and second closing elements (3, 4) arranged in series, said first and second closing elements (3, 4) are movable relative to each other and, in the closed position of the double-seat valve (1), prevent overflowing of fluids from a first valve housing part (2a; 2b) into a second valve housing part (2b; 2a) and in the closed as well as in the open position define a leakage cavity (16), which has a drain outlet leading downward, relative to a vertical arrangement of the double-seat valve (1), out of the second valve housing part (2b), having the first closing element (3) that is a slide piston and is driven independently and in its closed position rests, forming a seal, in a connecting opening (2c) joining the valve housing parts (2a, 2b) together, and during its downward directed opening movement into the completely open position (H), comes into contact in a sealing manner with the second closing element (4) assigned to a second seat (2e), and carries this also into the open position (H), having a first seat seal (10) arranged in the first sealing element (3) that seals radially against a cylindrical first seat (2d) formed in the connecting opening (2c), having the closing elements (3, 4) that can be moved independently of each other gap-wide by a partial lift (T1, T2), in each case, into a seat cleaning position for the purpose of flushing their seats (2d, 2e), wherein the second closing element (4) can be moved by a second partial lift (T2) in the same direction as the opening movement, and the first closing element (3) can be moved by a first partial lift (T1) in the direction counter to the opening movement, into its respective seat cleaning position, having valve rods (3a, 4a), arranged concentrically inside each other, for the closing elements (3, 4) that are led upward into a common drive (7), having a tubular shaft (4b), arranged at the second closing element (4), that penetrates the second valve housing part (2b) radially outside downward in a sealing manner, and connects the leakage cavity (16) radially inside via a drain bore (4c) with an area surrounding the double-seat valve (1), and that merges upward into the valve rod (4a) of the second closing element (4), wherein with the moved first closing element (3) with the first partial lift (T1) into the associated seat cleaning position, forming a first annular gap (S1), a sealing location (3a, 11; 3a, 11*; 3b, 11; 3b, 11*) is opened upward at a first passage (A) between the first valve rod (3a; 3b) moving the first closing element (3) and the associated first valve housing part (2a) in the form of a second annular gap (S2), and said gap connects the interior of the first valve housing part (2a) to a flush chamber (5b) of a first flush device (5.1; 5.1*), which encloses the first valve rod (3a, 3b).

2. The double-seat valve having a seat-cleaning function according to claim 1, wherein:
the flush chamber (5b) has an axial extension length, beginning at the sealing location (3a, 11; 3a, 11*, 3b, 11; 3b, 11*), of at least the complete opening lift (H) of the double-seat valve (1).

3. The double-seat valve having a seat-cleaning function according to claim 1, wherein:
the first valve rod (3a) is formed as a first pressure balancing piston (3b) in a movable area of the first passage (A) whose annular surface bounding the interior of the first valve housing part (2a) is formed equal to the adjacent annular surface of the first closing element (3).

4. The double-seat valve having a seat-cleaning function of claim 3, wherein:
the tubular shaft (4b) is formed as a second pressure balancing piston in a movable passage area of the second valve housing part (2b) whose diameter is smaller than the diameter of the connecting opening (2c).

5. The double-seat valve having a seat-cleaning function of claim 1, wherein:
the radial depth of the second annular gap (S2) is formed by a radial second setback (3d) provided at the first valve rod (3a, 3b) in an area of the second annular gap (S2), extending into the interior of the first part (2a).

6. The double-seat valve having a seat-cleaning function of claim 1, wherein:
the radial depth of the second annular gap (S2) is formed by an axially bounded radial recess (3d*), provided at the first valve rod (3a, 3b) in the area of the second annular gap (S2).

7. The double-seat valve having a seat-cleaning function of claim 1, wherein:
the radial depth of the second annular gap (S2) is formed by an axially bounded housing-side radial recess (2a*), provided in the first valve housing part (2a) in an area of the second annular gap (S2), and the first rod seal (11) is disposed on the first valve rod (3a, 3b).

8. The double-seat valve having a seat-cleaning function of claim 1, wherein:
the flush chamber (5b) is connected to the surroundings of the double-seat valve (1) via an outlet connection (5d).

9. The double-seat valve having a seat-cleaning function of claim 8, wherein:
the flush chamber (5b) discharges at its an upper end into an overflow (5c), and the overflow (5c) is connected on the other side to the outlet connection (5d).

10. The double-seat valve having a seat-cleaning function of claim 9, wherein:
an emptying bore (5e) is provided which connects the base area of the flush chamber (5b) to the outlet connection (5d).

11. The double-seat valve having a seat-cleaning function of claim 8, wherein:
the lower edge of the bore of the outlet connection (5d) extends down to the upper edge of the first rod seal (11, 11*) or to a boundary of the first rod seal (11, 11*).

12. The double-seat valve having a seat-cleaning function of claim 1, wherein:
the flush chamber (5b) is connected to the leakage cavity (16), and a connection path between the flush chamber (5b) and the leakage cavity (16) begins at a transverse bore (5f), formed in the first valve rod (3a, 3b), and discharging into the flush chamber (5b).

13. The double-seat valve having a seat-cleaning function of claim 12, wherein:
the transverse bore (5f) discharges on the other side of the flush chamber (5b) into an annular gap (15), which is formed between the first valve rod (3a, 3b), formed as a hollow rod, and the second valve rod (4a) penetrating said first valve rod centrally.

14. The double-seat valve having a seat-cleaning function of claim 12, wherein:
the transverse bore (5f) discharges on the other side of the flush chamber (5b) into a bore formed decentrally in the first valve rod (3a, 3b).

15. The double-seat valve having a seat-cleaning function of claim 1, wherein:
the flush chamber (5b) is connected to the drain bore (4c), and a connection path between the flush chamber (5b) and the drain bore (4c) begins at a transverse bore (5f), formed in the first valve rod (3a, 3b), and discharging into the flush chamber (5b).

16. The double-seat valve having a seat-cleaning function of claim 15, wherein:
the transverse bore (5f) discharges on the other side of the flush chamber (5b) into a bore formed centrally in the second valve rod (4a).

17. A method for cleaning the double-seat valve having a seat-cleaning function of claim 1, wherein:
in the course of the gap-wide exposure of the seat of the closing element that is pushed into a seat cleaning position by a first partial lift (T1), in the direction counter to the full opening lift (H), simultaneously a sealed first passage (A) of a valve rod connected to the closing element through the associated valve housing part is exposed gap-wide, such that cleaning fluid is fed from the interior of the associated valve housing part via the exposed first passage into a flush chamber of a first flush device, wherein the flush chamber encloses the areas of the valve rod contaminated with product during a complete opening and closing lift.

* * * * *